United States Patent
Baycroft et al.

(10) Patent No.: US 7,879,767 B2
(45) Date of Patent: Feb. 1, 2011

(54) ADDITIVES FOR HYDRATE INHIBITION IN FLUIDS GELLED WITH VISCOELASTIC SURFACTANTS

(75) Inventors: Perry Douglas Baycroft, Houston, TX (US); Allen D. Gabrysch, Houston, TX (US); James B. Crews, Willis, TX (US); Paul M. McElfresh, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 801 days.

(21) Appl. No.: 11/141,492

(22) Filed: May 31, 2005

(65) Prior Publication Data
US 2006/0027369 A1 Feb. 9, 2006

Related U.S. Application Data

(60) Provisional application No. 60/576,551, filed on Jun. 3, 2004.

(51) Int. Cl.
*E21B 43/27* (2006.01)
(52) U.S. Cl. .......................... 507/90; 507/219; 507/239; 507/244; 507/245; 507/246; 507/248; 507/261; 507/262; 166/305.1
(58) Field of Classification Search ........................ None
See application file for complete search history.

(56) References Cited

U.S. PATENT DOCUMENTS

| | | | | |
|---|---|---|---|---|
| 3,841,419 | A * | 10/1974 | Russell | 175/40 |
| 4,456,067 | A | 6/1984 | Pinner, Jr. | |
| 4,464,270 | A * | 8/1984 | Hollenbeak et al. | 507/209 |
| 4,552,672 | A * | 11/1985 | Walker | 507/240 |
| 4,553,601 | A * | 11/1985 | Almond et al. | 166/308.5 |
| 4,649,999 | A * | 3/1987 | Sandy et al. | 166/295 |
| 4,735,731 | A * | 4/1988 | Rose et al. | 507/105 |

(Continued)

FOREIGN PATENT DOCUMENTS

WO    WO 93/25798 A1    12/1993

(Continued)

OTHER PUBLICATIONS

J. P. Lederhos, et al., "Effective Kinetic Inhibitors for Natural Gas Hydrates," Chemical Engineering Science, 1996, pp. 1221-1229, vol. 51, No. 8, Pergamon.

(Continued)

*Primary Examiner*—John J Figueroa
(74) *Attorney, Agent, or Firm*—Mossman Kumar & Tyler PC

(57) ABSTRACT

An aqueous, viscoelastic fluid gelled with a viscoelastic surfactant (VES) is inhibited against hydrate formation with an effective amount of an additive that could be one or more halide salts of alkali metals and alkali earth metals, formate salts, alcohols, glycols, glycol amines, sugars, sugar alcohols, amidoamine oxides, polymers such as polyamines, polyvinylpyrrolidones and derivatives thereof, polyvinyl alcohols and derivatives thereof, polycaprolactams and derivatives thereof, hydroxyethylcellulose, and mixtures thereof. These fluids are inhibited against hydrate formation and may have increased viscosity as well. The additives may increase viscosity to the point where less VES is required to maintain a given viscosity. These inhibited, aqueous, viscoelastic fluids may be used as treatment fluids for subterranean hydrocarbon formations, such as in stimulation treatments, e.g. hydraulic fracturing fluids.

4 Claims, 8 Drawing Sheets

U.S. PATENT DOCUMENTS

| | | | | |
|---|---|---|---|---|
| 4,780,220 | A * | 10/1988 | Peterson | 507/107 |
| 5,076,364 | A * | 12/1991 | Hale et al. | 166/310 |
| 5,198,415 | A * | 3/1993 | Steiger | 507/103 |
| 5,260,268 | A * | 11/1993 | Forsberg et al. | 507/133 |
| 5,403,820 | A * | 4/1995 | Walker | 507/110 |
| 5,558,171 | A * | 9/1996 | McGlothlin et al. | 175/64 |
| 5,600,044 | A * | 2/1997 | Colle et al. | 585/15 |
| 5,658,860 | A * | 8/1997 | Clark et al. | 507/134 |
| 5,741,748 | A * | 4/1998 | Allen et al. | 502/25 |
| 5,785,747 | A * | 7/1998 | Vollmer et al. | 106/194.2 |
| 5,944,106 | A * | 8/1999 | Dalrymple et al. | 166/281 |
| 5,964,295 | A | 10/1999 | Brown et al. | |
| 5,979,557 | A * | 11/1999 | Card et al. | 166/300 |
| 6,025,302 | A * | 2/2000 | Pakulski | 507/90 |
| 6,035,936 | A * | 3/2000 | Whalen | 166/308.3 |
| 6,080,704 | A * | 6/2000 | Halliday et al. | 507/136 |
| 6,103,671 | A * | 8/2000 | Dobson et al. | 507/261 |
| 6,148,917 | A * | 11/2000 | Brookey et al. | 166/301 |
| 6,180,699 | B1 * | 1/2001 | Bakeev et al. | 524/104 |
| 6,232,273 | B1 * | 5/2001 | Namba et al. | 507/90 |
| 6,239,183 | B1 | 5/2001 | Farmer et al. | |
| 6,258,859 | B1 * | 7/2001 | Dahayanake et al. | 516/77 |
| 6,432,885 | B1 * | 8/2002 | Vollmer | 507/236 |
| 6,518,223 | B2 * | 2/2003 | Schilling et al. | 507/104 |
| 6,566,309 | B1 * | 5/2003 | Klug et al. | 507/90 |
| 6,605,570 | B2 * | 8/2003 | Miller et al. | 507/211 |
| 6,656,885 | B2 * | 12/2003 | House et al. | 507/110 |
| 6,776,235 | B1 * | 8/2004 | England | 166/271 |
| 6,857,485 | B2 * | 2/2005 | Patel et al. | 175/64 |
| 6,903,054 | B2 * | 6/2005 | Fu et al. | 507/244 |
| 7,012,043 | B2 * | 3/2006 | Klein et al. | 507/133 |
| 7,304,012 | B2 * | 12/2007 | Green et al. | 502/180 |
| 2002/0033260 | A1 | 3/2002 | Lungwitz et al. | |
| 2002/0076803 | A1 * | 6/2002 | Crews | 435/266 |
| 2002/0189810 | A1 * | 12/2002 | DiLullo et al. | 166/294 |
| 2003/0015321 | A1 * | 1/2003 | Lim et al. | 166/263 |
| 2003/0060372 | A1 * | 3/2003 | Fan et al. | 507/117 |
| 2003/0092584 | A1 * | 5/2003 | Crews | 507/200 |
| 2003/0119680 | A1 | 6/2003 | Chang et al. | |
| 2003/0236174 | A1 | 12/2003 | Fu et al. | |
| 2004/0023812 | A1 * | 2/2004 | England et al. | 507/100 |
| 2004/0084181 | A1 * | 5/2004 | Wood et al. | 166/278 |
| 2004/0097385 | A1 * | 5/2004 | Chen et al. | 510/130 |
| 2005/0037928 | A1 | 2/2005 | Qu et al. | |

FOREIGN PATENT DOCUMENTS

| | | | |
|---|---|---|---|
| WO | WO 96/41785 | A1 | 12/1996 |
| WO | WO 98/40446 | A1 | 9/1998 |
| WO | WO 9856497 | A1 * | 12/1998 |

OTHER PUBLICATIONS

PCT International Search Report for PCT/US2005/019702, Nov. 14, 2005.

* cited by examiner

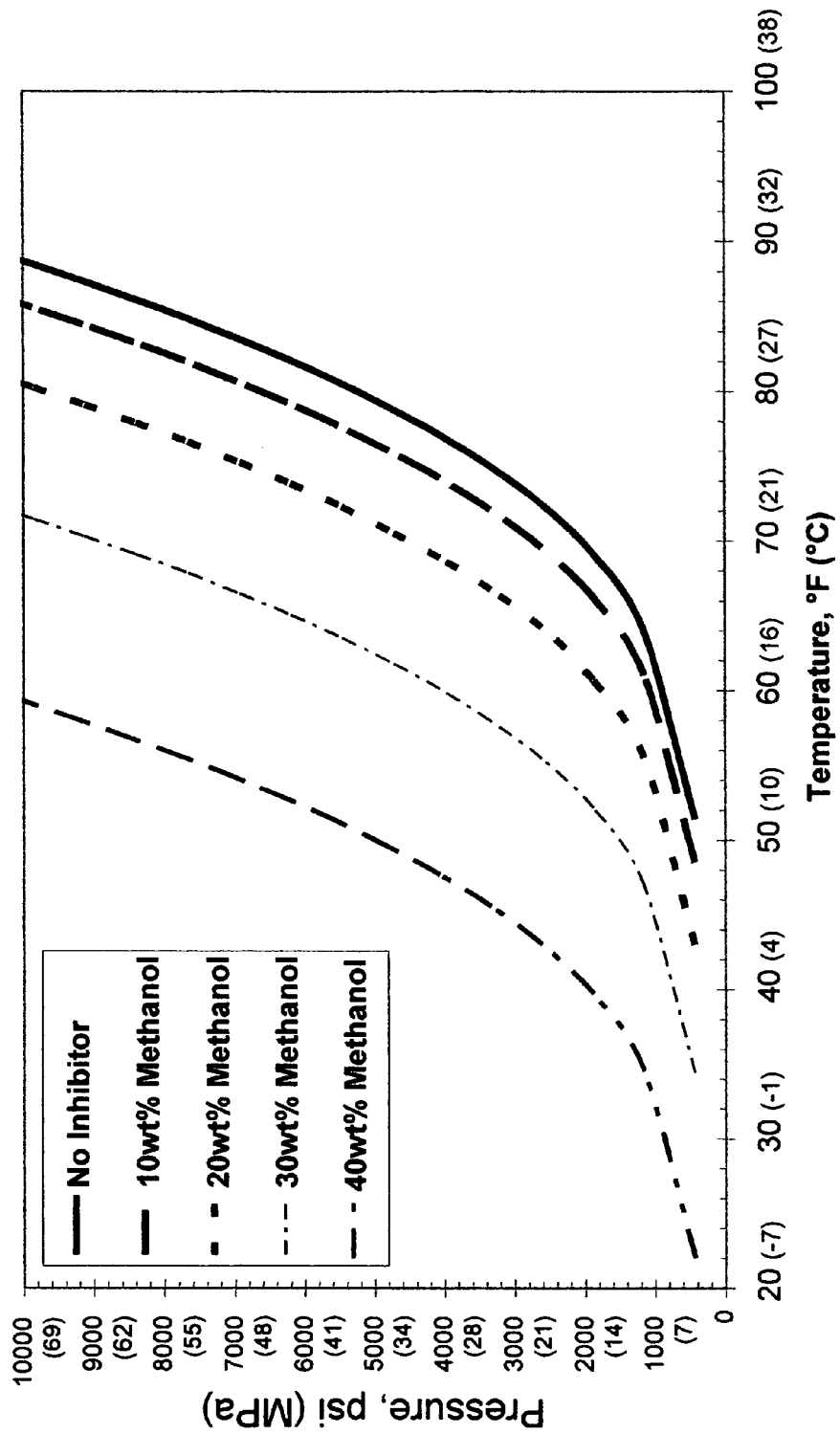

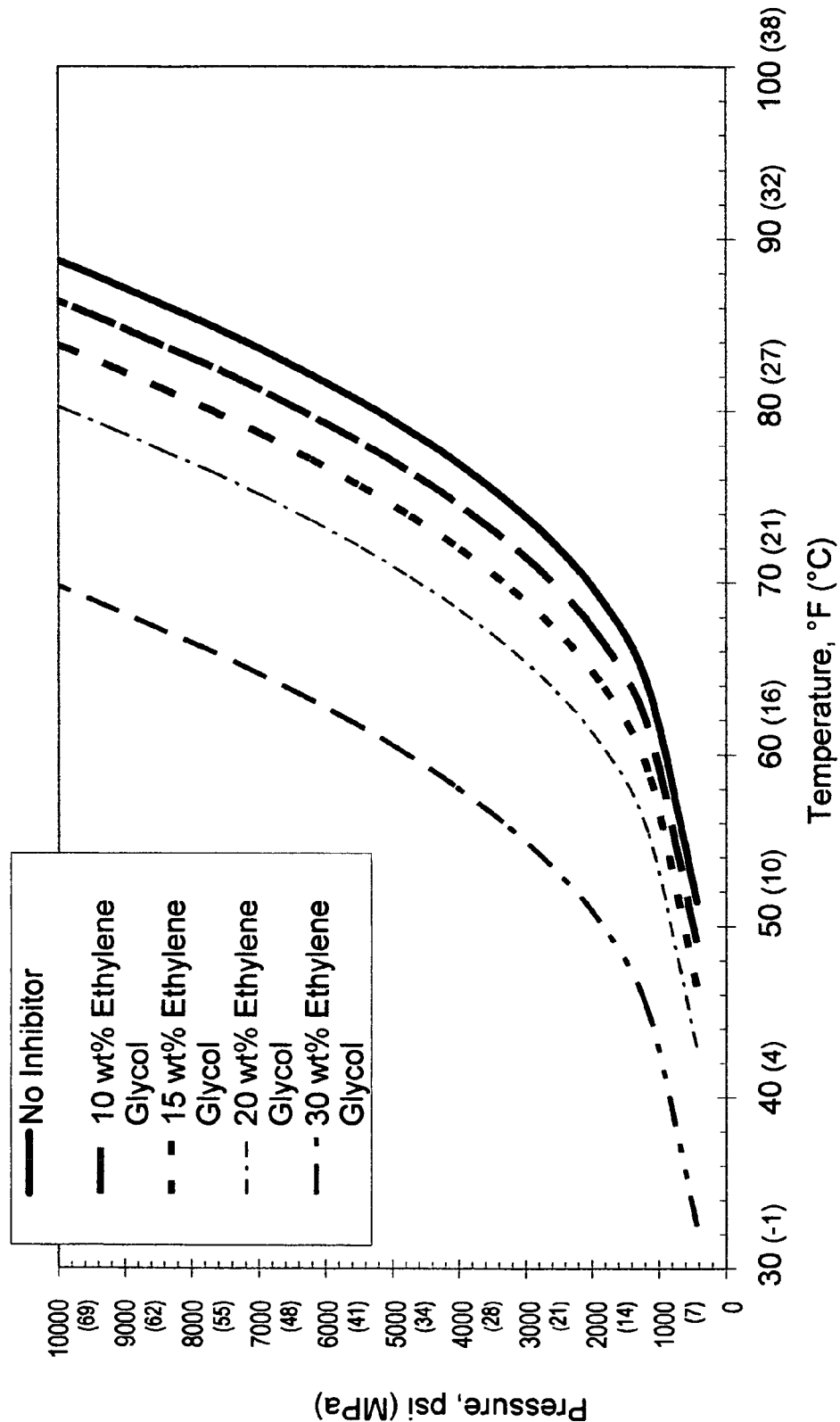

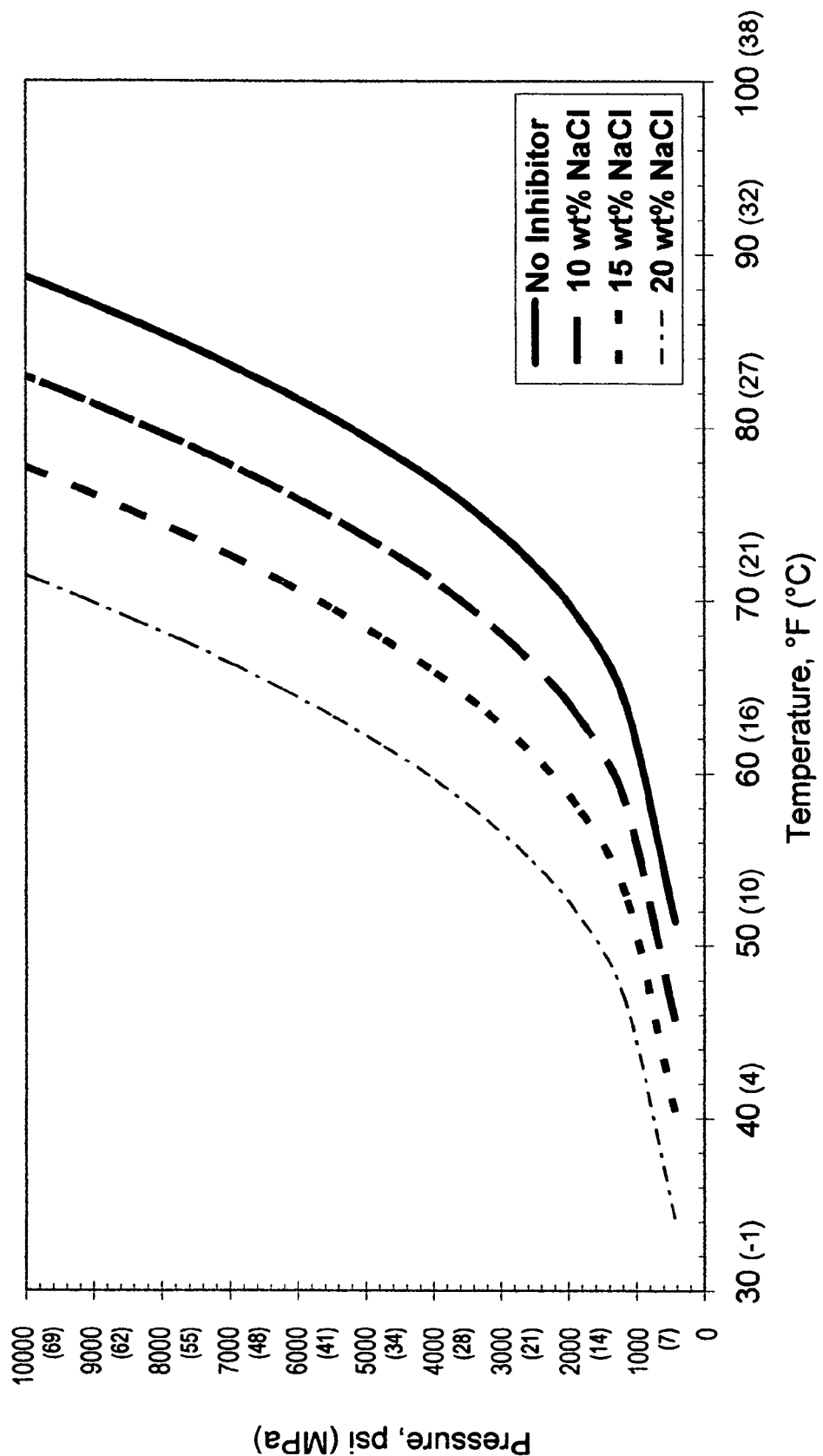

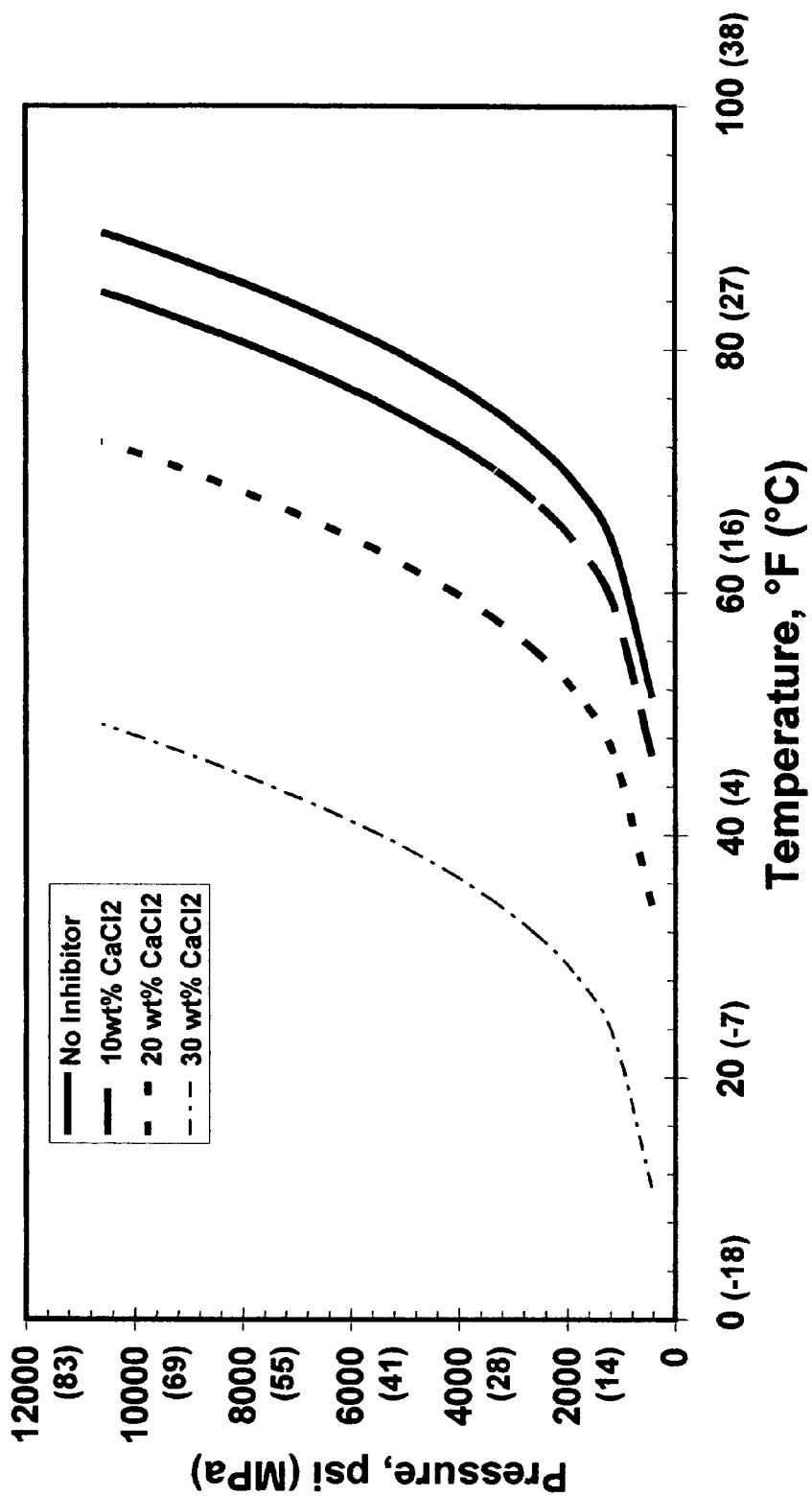
FIG. 4 - Hydrate Phase Equilibrium Calcium Chloride with Reference Gas Mixture

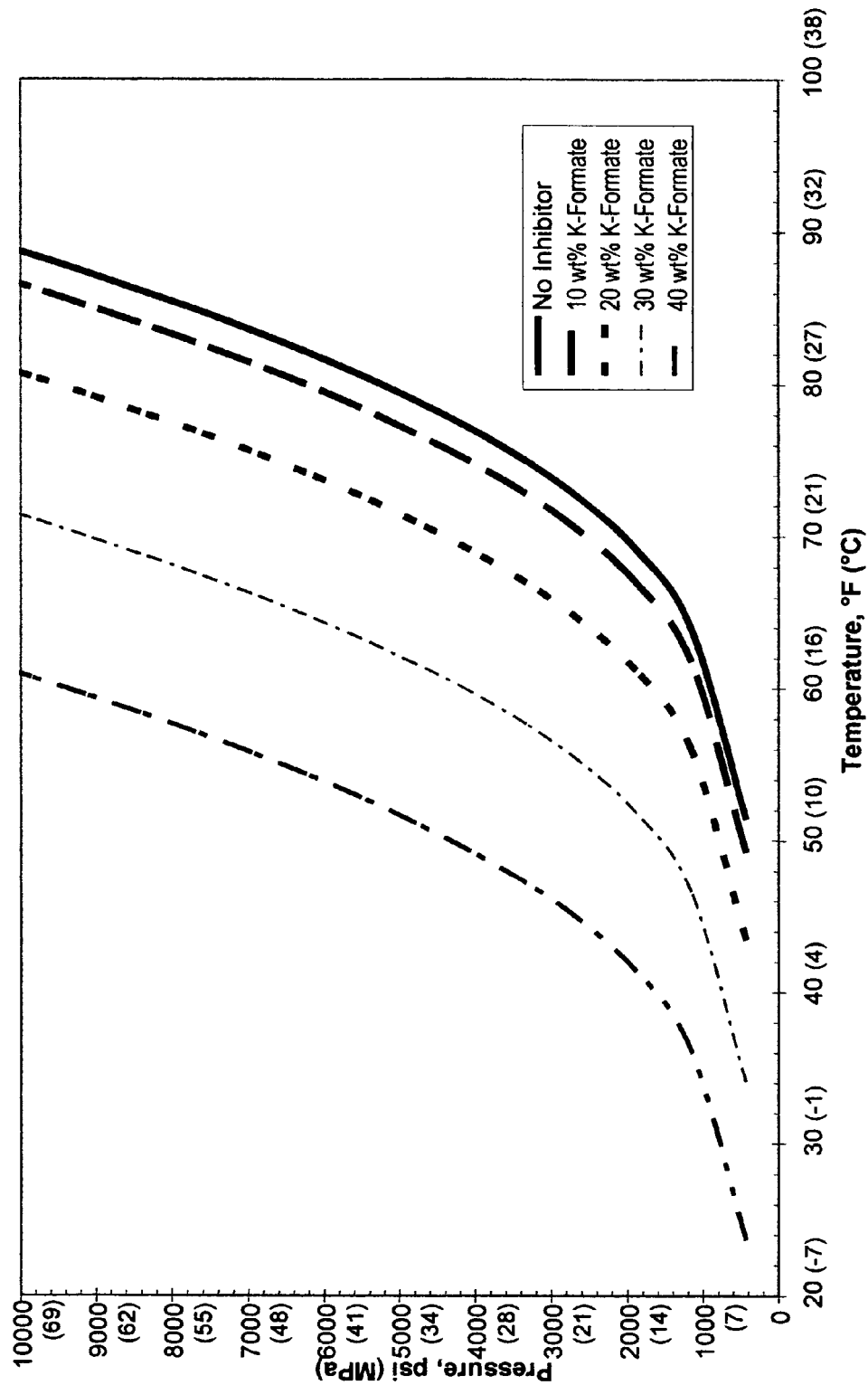

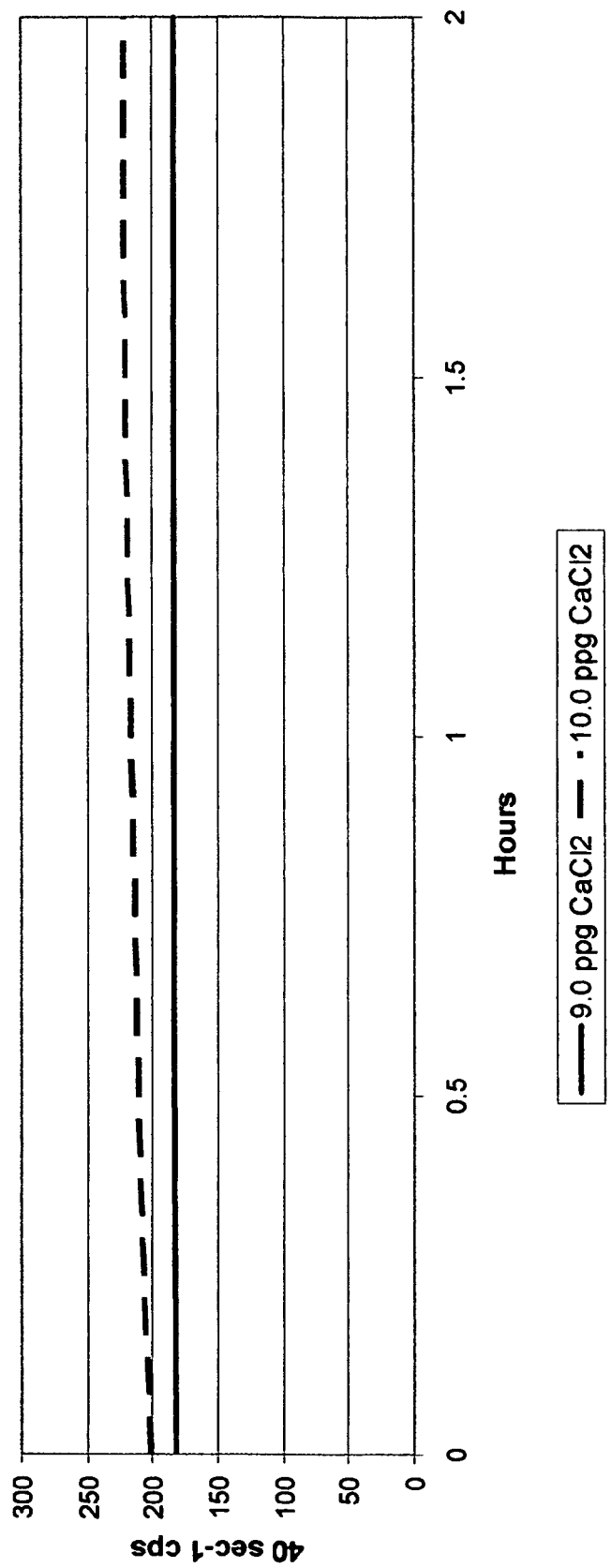

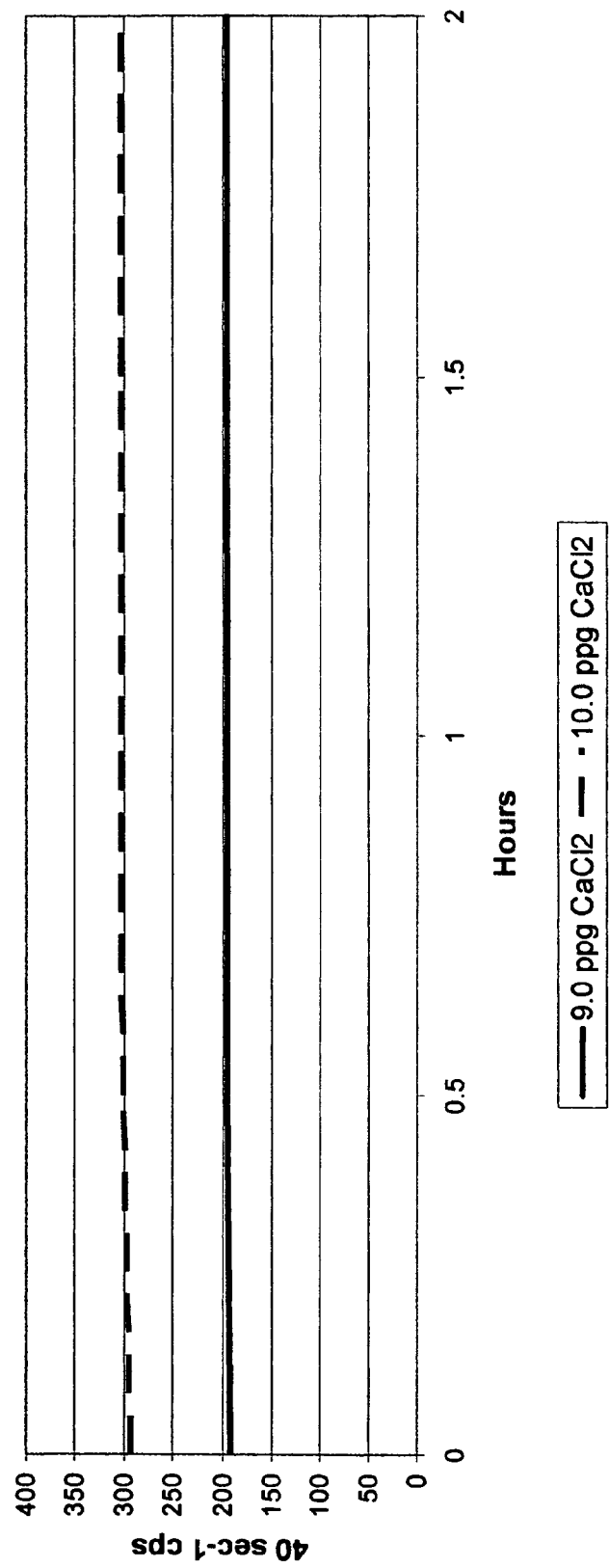

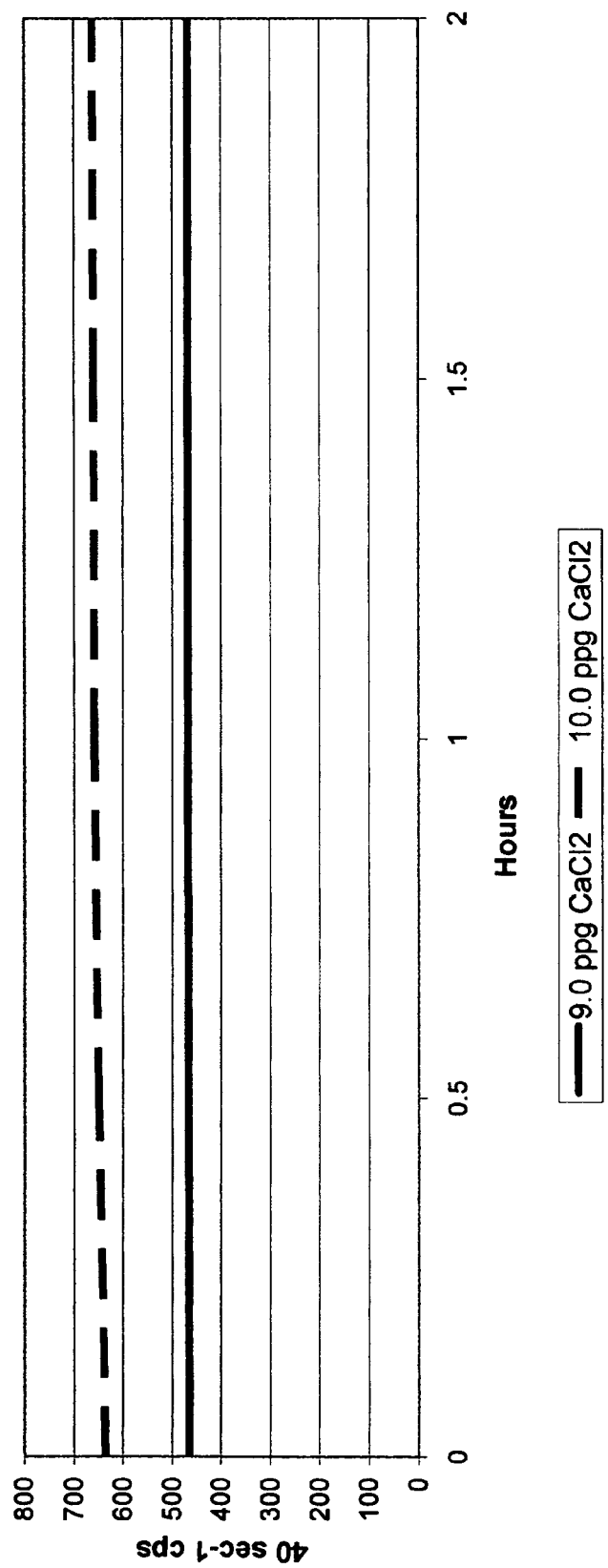

ADDITIVES FOR HYDRATE INHIBITION IN FLUIDS GELLED WITH VISCOELASTIC SURFACTANTS

CROSS-REFERENCE TO RELATED APPLICATION

This application claims the benefit of U.S. provisional application No. 60/576,551 filed Jun. 3, 2004.

FIELD OF THE INVENTION

The present invention relates to aqueous, viscoelastic fluids used during hydrocarbon recovery operations, and more particularly relates, in one embodiment, to methods and additives for inhibiting hydrate formation in such aqueous, viscoelastic fluids.

BACKGROUND OF THE INVENTION

In hydrocarbon recovery operations, stimulation fluids are treatment fluids prepared for stimulation purposes, most commonly matrix stimulation fluids. Most matrix stimulation fluids are acid or solvent-based, with hydrochloric acid being the most common acid due to its reaction characteristics and its relative ease of control. Stimulation generally concerns a treatment performed to restore or enhance the productivity of a well. Stimulation treatments fall into two main groups, hydraulic fracturing treatments and matrix treatments. Fracturing treatments are performed above the fracture pressure of the reservoir formation and create a highly conductive flow path between the reservoir and the wellbore. Matrix treatments are performed below the reservoir fracture pressure and generally are designed to restore the natural permeability of the reservoir following damage to the near-wellbore area.

Hydraulic fracturing is a method of using pump rate and hydraulic pressure to fracture or crack a subterranean formation. Once the crack or cracks are made, high permeability proppant, relative to the formation permeability, is pumped into the fracture to prop open the crack. When the applied pump rates and pressures are reduced or removed from the formation, the crack or fracture cannot close or heal completely because the high permeability proppant keeps the crack open. In the case of acid fracturing acid, the acid etches the formation face creating highly conductive flow paths from the formation back to the wellbore. The propped crack or fracture provides a high permeability path connecting the producing wellbore to a larger formation area to enhance the production of hydrocarbons.

The development of suitable fracturing fluids is a complex art because the fluids must simultaneously meet a number of conditions. For example, they must be stable at high temperatures and/or high pump rates and shear rates which can cause the fluids to degrade and prematurely settle out the proppant before the fracturing operation is complete. Various fluids have been developed, but most commercially used fracturing fluids are aqueous based liquids which have either been gelled or foamed. When the fluids are gelled, typically a polymeric gelling agent, such as a solvatable polysaccharide is used, which may or may not be crosslinked. The thickened or gelled fluid helps keep the proppants within the fluid during the fracturing operation.

Aqueous fluids gelled with viscoelastic surfactants (VESs) are also known in the art.

Under certain conditions, polymer-gelled fluids will form gas hydrates. A number of hydrocarbons, especially lower-boiling light hydrocarbons, in formation fluids or natural gas or stimulation and other treatment fluids are known to form hydrates in conjunction with the water present in the system under a variety of conditions—particularly at a combination of lower temperature and higher pressure. The hydrates usually exist in solid forms that are essentially insoluble in the fluid itself. As a result, any solids in stimulation or other fluid are at least a nuisance for production, handling and transport of these fluids. It is not uncommon for hydrate solids (or crystals) to cause plugging and/or blockage of pipelines or transfer lines or other conduits, valves and/or safety devices and/or other equipment, resulting in shutdown, loss of production and risk of explosion or unintended release of hydrocarbons and other materials into the environment either on-land or off-shore. Accordingly, hydrocarbon hydrates have been of substantial interest as well as concern to many industries, particularly the petroleum and natural gas industries.

Hydrocarbon hydrates are clathrates, and are also referred to as inclusion compounds. Clathrates are cage structures formed between a host molecule and a guest molecule. A hydrocarbon hydrate generally is composed of crystals formed by water host molecules surrounding the hydrocarbon guest molecules. The smaller or lower-boiling hydrocarbon molecules, particularly C1 (methane) to C4 hydrocarbons and their mixtures, are more problematic because it is believed that their hydrate or clathrate crystals are easier to form. For instance, it is possible for ethane to form hydrates at as high as 4° C. at a pressure of about 1 MPa. If the pressure is about 3 MPa, ethane hydrates can form at as high a temperature as 14° C. Even certain non-hydrocarbons such as carbon dioxide, nitrogen and hydrogen sulfide are known to form hydrates under the proper conditions.

There are two broad techniques to overcome or control the hydrocarbon hydrate problems, namely thermodynamic and kinetic. For the thermodynamic approach, there are a number of reported or attempted methods, including water removal, increasing temperature, decreasing pressure, addition of "antifreeze" to the fluid and/or a combination of these. The kinetic approach generally attempts (a) to prevent the smaller hydrocarbon hydrate crystals from agglomerating into larger ones (known in the industry as an anti-agglomerate and abbreviated AA) and/or; (b) to inhibit and/or retard initial hydrocarbon hydrate crystal nucleation; and/or crystal growth (known in the industry as a kinetic hydrate inhibitor and abbreviated KHI). Thermodynamic and kinetic hydrate control methods may be used in conjunction.

Kinetic efforts to control hydrates have included use of different materials as inhibitors. For instance, onium compounds (e.g. ammonium compounds, phosphonium compounds, amine oxides, etc.) with at least four carbon substituents are used to inhibit the plugging of conduits by gas hydrates. Additives such as polymers with lactam rings have also been employed to control clathrate hydrates in fluid systems. These kinetic inhibitors are commonly labeled Low Dosage Hydrate Inhibitors (LDHI) in the art.

Thus, it is desirable if new gas hydrate inhibitors were discovered which would yield comparable or improved results over known gas hydrate inhibitors. It would also be desirable if a composition and method could be devised to inhibit aqueous VES-gelled fluids against the formation of hydrates.

SUMMARY OF THE INVENTION

Accordingly, it is an object of the present invention to provide an aqueous, non-polymer, viscoelastic stimulation fluid that has been inhibited against hydrate formation.

It is another object of the present invention to provide an aqueous treatment fluid, such as those used in hydrocarbon recovery operations, that is viscosified with a viscoelastic surfactant (VES) that is inhibited against hydrate formation.

Still another object of the invention is to provide an aqueous viscoelastic fluid gelled with a VES that is inhibited against hydrate formation and which may simultaneously have increased viscosity.

In carrying out these and other objects of the invention, there is provided, in one form, a method for inhibiting hydrate formation in a treating fluid that concerns an aqueous viscoelastic treating fluid which includes an aqueous base fluid and a viscoelastic surfactant (VES) gelling agent. An amount of an additive effective to inhibit hydrate formation is introduced into in the viscoelastic treating fluid. The additive is soluble in the fluid and may be a halide salt of an alkali metal and/or an alkali earth metal, a formate salt, an alcohol, a glycol, a sugar, a sugar alcohol, an amidoamine oxide, a polyamine, hydroxyethylcellulose (HEC), and mixtures thereof. Small concentrations of polyvinylpyrrolidone (PVP) or its derivatives, polyvinyl alcohols (PVA) or its derivatives, polycaprolactam or its derivatives, co-polymers of pyrrolidones, polyvinyl alcohols, and caprolactams, glycol amines such as triethylene glycol diamine, and polyamines have also been shown to be effective as LDHI's.

There is further provided in another non-limiting embodiment of the invention an aqueous viscoelastic treating fluid inhibited against hydrate formation. The fluid includes an aqueous base fluid and a viscoelastic surfactant (VES) gelling agent. The fluid also includes an amount of additive effective to inhibit hydrate formation. The additive is soluble in the fluid and may be a halide salt of an alkali metal and/or an alkali earth metals, formate salts, alcohols, glycols, sugars, sugar alcohols, glycol amines, amidoamine oxides, polyamines, polyvinylpyrrolidones and derivatives thereof, polyvinyl alcohols and derivatives thereof, polycaprolactams and derivatives thereof, hydroxyethylcellulose, and mixtures thereof.

BRIEF DESCRIPTION OF THE DRAWINGS

FIG. 1 is a graph computer modeling results for the approximate hydrate phase equilibrium for a reference gas mixture with no and varying amounts of methanol showing that the curves shift to lower temperatures for increasing amounts of methanol;

FIG. 2 is a graph computer modeling results for the approximate hydrate phase equilibrium for the reference gas mixture with no and varying amounts of ethylene glycol showing that the curves shift to lower temperatures for increasing amounts of ethylene glycol;

FIG. 3 is a graph computer modeling results for the approximate hydrate phase equilibrium for the reference gas mixture with no and varying amounts of sodium chloride showing that the curves shift to lower temperatures for increasing amounts of sodium chloride;

FIG. 4 is a graph computer modeling results for the approximate hydrate phase equilibrium for the reference gas mixture with no and varying amounts of calcium chloride showing that the curves shift to lower temperatures for increasing amounts of calcium chloride;

FIG. 5 is a graph computer modeling results for the approximate hydrate phase equilibrium for the reference gas mixture with no and varying amounts of potassium formate showing that the curves shift to lower temperatures for increasing amounts of potassium formate;

FIG. 6 is a graph showing a small increase in viscosity over time of a 4% VES-gelled fluid at 100° F. (38° C.) at two different concentrations of $CaCl_2$ additive;

FIG. 7 is a graph showing an increase in viscosity over time of a 4% VES-gelled fluid at 150° F. (66° C.) at two different concentrations of $CaCl_2$ additive; and FIG. 8 is a graph showing an increase in viscosity over time of a 6% VES-gelled fluid at 175° F. (79° C.) at two different concentrations of $CaCl_2$ additive.

DETAILED DESCRIPTION OF THE INVENTION

The invention concerns the use of weighted brines for oil and gas well treatments where it has been surprisingly discovered that the salinity of the brine can inhibit hydrate formation. The invention is expected to be applicable to gelled, high density brines as well. The invention further involves the use of well treatment fluids conditioned with salts, alcohols, sugars, sugar alcohols, polymers and other soluble materials used to suppress the freezing temperature. Additionally, well stimulation fluids conditioned with salts of this invention suppress the freezing temperature of the treating fluid. Adding materials that are soluble in water are known to suppress the freezing temperature and elevate the boiling temperature in proportion to their concentration. In the practice of oil field completion work and oil field stimulation work salts are used to increase the density of completion brines to maintain the hydrostatic head of the fluid column for well control. These salts, such as sodium chloride, potassium chloride, calcium chloride, sodium bromide, calcium bromide, salts of cesium, formate salts, as well as alcohols, glycols, sugars, sugar alcohols and other soluble materials are known to suppress the freezing temperature of the fluid. Using a fluid with the appropriate salt concentration as a stimulation fluid during a stimulation treatment will aid in suppressing hydrate formation when the fluid is produced back out of the formation.

In more detail, the invention discloses the use of viscoelastic surfactant (VES) fluids mixed with weighted brines as well treatment and or well stimulation fluids where the salinity of the brine is used to inhibit gas hydrate formation. The invention is novel and unexpected in that most well simulation fluids, i.e., crosslinked polymer fluids, often do not tolerate high concentrations of salts. Other gelling agents that can be used to viscosify weighted brines, include, but are not necessarily limited to, hydroxyethyl cellulose (HEC); carboxymethylhydroxyethyl cellulose (CMHEC); carboxymethylhydroxyethyl Guar, polysaccharides or biopolymers known as XC and Xanvis® clarified xanthan gums available from Kelco Oil Field Group and many other derivatized cellulose and/or polysaccharide polymers and co-polymers.

The use of a VES to viscosify well treatment and stimulation fluids conditioned with high concentrations of salts, substances which yield ions, other than hydrogen or hydroxyl ions, with a salinity of greater than 10% by weight of water are seen to provide freezing temperature suppression that would be beneficial to hydrate inhibition in oil and gas wells during well treatment and stimulation operations. Salt concentrations of >15 wt % of water would provide more benefit in freezing temperature suppression up to a limit where the freezing temperature starts to increase. Salt solutions will have an optimum concentration, beyond which increasing the salt concentration actually starts to increase the freezing temperature until the freezing temperature will increase to above 32° F. (0° C.). Decreasing the freezing point of a well treatment, stimulation or workover fluid inhibits hydrate formation.

Hydrates are a problem in producing wells where crystalline compounds of water ($H_2O$) and methane gas ($CH_4$) i.e., natural gas, as a non-limiting example form downhole blocking production. The water freezes forming microscopic cages (ice lattices or clathrates) containing the gas molecules. In one example, hydrates form in high pressure producing gas wells when the temperature and pressure combine to from ice. In the practice of oil field completion work and oil field stimulation work salts are used to increase the density of completion brines to maintain the hydrostatic head pressure of the fluid column for well control. These additives, which can include, but are not limited to, sodium chloride, potassium chloride, calcium chloride, sodium bromide, calcium bromide, salts of cesium, salts of formates, and all other soluble materials such as sugars, sugar alcohols, alcohols and glycols, and polymers, are also known to suppress the freezing temperature of the fluid and increase its density.

Using a fluid with the appropriate salt concentration as a stimulation fluid during a stimulation treatment will aid in suppressing hydrate formation when the fluid is produced back out of the formation. Using salts with other materials may also aid in depressing the freezing temperature of water. Other gelling agents such as HEC, co-polymers of HEC, carboxymethyl cellulose, CMHEC, polyacrylamides, polysaccharides, starches, guar polymers, co-polymers of guar and other materials can and have been used as viscosifying agents for brines and weighted brines for use as well treatment and or well stimulation fluids. Some heavy brines viscosified with these materials also perform as well treatment and or stimulation fluids where the brine density is used to depress the freezing temperature. Stimulation fluids gelled with these other materials may have hydrate formation inhibited with the other additives of this invention as well.

It is further disclosed that salts can be used as a viscosity enhancing agent in VES fluids, that is, as part of a method to increase the viscosity yield of the VES surfactant. The use of salts to increase viscosity means that less VES surfactant is required to achieve the same viscosity or more viscosity can be obtained from a given VES concentration. Thus, with the addition of the salts or other additive, less VES need be used to achieve the same viscosity.

In the method of the invention, an aqueous fracturing fluid, as a non-limiting example, is first prepared by blending a VES into an aqueous fluid. The aqueous base fluid could be, for example, water, brine, or aqueous-based foams. The brine base fluid may be any brine, conventional or to be developed which serves as a suitable media for the various concentrate components. As a matter of convenience, in many cases the brine base fluid may be the brine available at the site used in the completion fluid, for a non-limiting example.

The brines useful in the fluids of this invention may be prepared using salts including, but not necessarily limited to, NaCl, KCl, $CaCl_2$, $MgCl_2$, $NH_4Cl$, $CaBr_2$, $NaBr_2$, ZnBr, sodium formate, potassium formate, cesium formate and other commonly used stimulation and completion brine salts. The concentration of the salts to prepare the brines can be from about 0.5% by weight of water up to near saturation for a given salt in fresh water, such as 10%, 20%, 30% and higher percent salt by weight of water. The brine can be a combination of one or more of the mentioned salts, such as a brine prepared using NaCl and $CaCl_2$ or NaCl, $CaCl_2$, and $CaBr_2$ as non-limiting examples. The maximum amount of additive or salt is the point at which the VES surfactant will no longer dissolve in the brine.

Other additives include but are not limited to, alcohols and glycols, generally lower molecular weight glycols. Specific suitable alcohols and glycols include, but are not necessarily limited to, butanol and alcohols of C5 or higher, mono-, di- and triethylene glycol, mono-, di- and tripropylene glycol, dibutylene glycol, glycol ethers such as ethylene glycol monobutyl ether and diethylene glycol methyl ether, low cloud point glycols, glycol amines, polyglycerin, polyglycol, and mixtures thereof.

Another class of additives is sugars and sugar alcohols. Specific suitable sugars and sugar alcohols include, but are not necessarily limited to, glucose, fructose, galactose, mannose, maltose, sucrose, sorbitol, mannitol, xylitol, and mixtures thereof. Thus, this latter group of additives do not increase viscosity of the VES-gelled fluids as compared with identical fluids without these additives.

Still another group of additives is polymers. Specific suitable polymers include, but are not necessarily limited to, polyvinylpyrollidone (PVP) or its derivatives, polyvinyl alcohols (PVA) or its derivatives, polycaprolactam (PCL) or its derivatives, co-polymers of PVP, PVA, and PCL, hydroxyethylcellulose (HEC), copolymers of HEC, carboxymethyl cellulose (CMC), carboxymethylhydroxyethylcellulose (CMHEC), guar polymers and their derivatives, polyacrylamides, and polyamines and mixtures thereof.

It is difficult to specify in advance what the desirable level of the additive should be in the VES-gelled aqueous fluid due to a number of complex interrelated factors including, but not necessarily limited to, the nature and amount of viscoelastic surfactant in the fluid, the type of additive, the type and proportions of other components in the fluid, the temperatures and pressures the fluid will be subjected to, etc. Nevertheless, in order to give some idea of expected typical proportions to be used, with respect to the halide salts of alkali metals and alkali earth metals, formate salts, the additive is added in a proportion ranging from about 20 wt % up to the proportion where the VES gelling agent will no longer dissolve in the brine, in one non-limiting embodiment. In another non-restrictive version, the proportion may range from about 25 wt % and higher, and alternatively from about 30 wt % and higher. With respect to the other additives, alcohols, glycols, sugars, sugar alcohols, glycol amines, amidoamine oxides, polyamines, polyvinylpyrrolidones and derivatives thereof, polyvinyl alcohols and derivatives thereof, polycaprolactams and derivatives thereof, guar polymers and derivatives thereof, hydroxyethylcellulose, the proportion range may be from about 0.1 to about 4.0 wt %, alternatively from about 0.5 to about 3.0 wt %.

Any suitable mixing apparatus may be used for this procedure. In the case of batch mixing, the VES and the aqueous fluid are blended for a period of time sufficient to form a gelled or viscosified solution. The VES that is useful in the present invention can be any of the VES systems that are familiar to those in the well service industry, and may include, but are not limited to, amines, amine salts, quaternary ammonium salts, amidoamine oxides, amine oxides, mixtures thereof and the like. Suitable amines, amine salts, quaternary ammonium salts, amidoamine oxides, and other surfactants are described in U.S. Pat. Nos. 5,964,295; 5,979,555; and 6,239,183, incorporated herein by reference.

Viscoelastic surfactants improve the fracturing (frac) fluid performance through the use of a polymer-free system. These systems offer improved viscosity breaking, higher sand transport capability, are more easily recovered after treatment, and are relatively non-damaging to the reservoir. The systems are also more easily mixed "on the fly" in field operations and do not require numerous co-additives in the fluid system, as do some prior systems.

The viscoelastic surfactants suitable for use in this invention include, but are not necessarily limited to, non-ionic, cationic, amphoteric, and zwitterionic surfactants. Specific examples of zwitterionic/amphoteric surfactants include, but are not necessarily limited to, dihydroxyl alkyl glycinate, alkyl ampho acetate or propionate, alkyl betaine, alkyl amidopropyl betaine and alkylimino mono- or di-propionates derived from certain waxes, fats and oils. Quaternary amine surfactants are typically cationic, and the betaines are typically zwitterionic. The thickening agent may be used in conjunction with an inorganic water-soluble salt or organic additive such as phthalic acid, salicylic acid or their salts.

Some non-ionic fluids are inherently less damaging to the producing formations than cationic fluid types, and are more efficacious per pound than anionic gelling agents. Amine oxide viscoelastic surfactants have the potential to offer more gelling power per pound, making it less expensive than other fluids of this type.

The amine oxide gelling agents $RN^+(R')_2O^-$ may have the following structure (I):

where R is an alkyl or alkylamido group averaging from about 8 to 24 carbon atoms and R' are independently alkyl groups averaging from about 1 to 6 carbon atoms. In one non-limiting embodiment, R is an alkyl or alkylamido group averaging from about 8 to 16 carbon atoms and R' are independently alkyl groups averaging from about 2 to 3 carbon atoms. In an alternate, non-restrictive embodiment, the amidoamine oxide gelling agent is Akzo Nobel's Aromox APA-T formulation, which should be understood as a dipropylamine oxide since both R' groups are propyl.

Materials sold under U.S. Pat. No. 5,964,295 include ClearFRAC™, which may also comprise greater than 10% of a glycol. One preferred VES is an amine oxide. As noted, a particularly preferred amine oxide is APA-T, sold by Baker Oil Tools as SurFRAQ™ VES. SurFRAQ is a VES liquid product that is 50% APA-T and 40% propylene glycol. These viscoelastic surfactants are capable of gelling aqueous solutions to form a gelled base fluid. The additives of this invention may also be used in Diamond FRAQ™ which is a VES system, similar to SurFRAQ, sold by Baker Oil Tools.

The invention covers commonly known materials as Aromox APA-T manufactured by Akzo Nobel and other known viscoelastic surfactant gelling agents compatible with stimulation treatment of subterranean formations.

The amount of VES included in the fracturing fluid depends on at least two factors. One involves generating enough viscosity to control the desired rate of fluid leak off into the pores of the fracture, and the second involves creating a viscosity high enough to keep the proppant particles suspended therein during the fluid injecting step, in the non-limiting case of a fracturing fluid. Thus, depending on the application, the VES is added to the aqueous fluid in concentrations ranging from about 0.5 to 25% by volume, alternatively up to about 12 vol % of the total aqueous fluid (from about 5 to 120 gallons per thousand gallons (gptg)). In another non-limiting embodiment, the range for the present invention is from about 1.0 to about 6.0% by volume VES product. In an alternate, non-restrictive form of the invention, the amount of VES ranges from 2 to about 10 volume % or greater depending on the amount of desired viscosity.

It has also been discovered that the viscosity of the VES-gelled aqueous fluid may increase using the additives of this invention. Thus, since the viscoelastic surfactants are relatively more expensive, less of the VES than normal may be used with the additives of this invention to achieve the same viscosity, thereby reducing the total cost of the gelled fluid.

In hydraulic fracturing applications, propping agents are typically added to the base fluid after the addition of the VES. Propping agents include, but are not limited to, for instance, quartz sand grains, glass and ceramic beads, sintered bauxite grains, sized calcium carbonate, sized salts, walnut shell fragments, aluminum pellets, nylon pellets, and the like. The propping agents are normally used in concentrations between about 0.5 to 14 pounds per gallon (60-1700 kg/m$^3$) of fracturing fluid composition, but higher or lower concentrations can be used as the fracture design requires. The base fluid can also contain other conventional additives common to the well service industry such as water wetting surfactants, non-emulsifiers and the like. In this invention, the base fluid can also contain additives which can contribute to breaking the gel (reducing the viscosity) of the VES fluid.

Of particular note, in the reduced viscosity form of the gel, the surfactant gelling agent can now act as an amine oxide hydrate inhibitor that remains in the aqueous phase of the flow back fluids. That is, when the aqueous viscoelastic treating fluid has its gel "broken" or has its viscosity reduced and is flowed back from the formation, the VES can act as a hydrate inhibitor. In a sense, it changes from a non-damaging gelling agent during the hydraulic fracturing operation to a hydrate inhibitor in the flow back. It should be noted that the flow back stage of a frac job is considered the point at which the risk of hydrate formation is highest.

While the viscoelastic fluids of the invention are described most typically herein as having use in fracturing fluids, it is expected that they will find utility in acidizing fluids, gravel pack fluids, stimulation fluids and the like. Of course, when the treatment fluid is a fracturing fluid, the fluids also contain at least an effective amount of a proppant to prop open the fractures, and the fluid is injected into the formation under sufficient and effective hydraulic pressure and pump rate to fracture the formation. When the treatment fluid is an acidizing fluid, it further contains an effective amount of an acid, either inorganic or organic, of sufficient strength to acidize the formation. When the viscoelastic surfactants are used in a gravel packing fluid, the gelling agent helps contain an effective amount of the gravel within the fluid. If the viscoelastic surfactants are used in another well stimulation fluid, an effective amount of any additional stimulating agent is employed. When the viscoelastic surfactants are used in a fluid loss control application, an effective amount of a salt or easily removed solid is employed, and the amine oxide gelling agents help suspend the salts or solids in the fluid. These other components of the treatment fluids are well known in the art.

In another embodiment of the invention, the treatment fluid may contain other viscosifying agents, other surfactants, clay stabilization additives, scale dissolvers, biopolymer degradation additives, and other common components.

A basic method is to inject the proppant into a carrier fluid or treatment brine downstream from the conventional pumps which are delivering the gravel packing fluid, e.g. To do this, the proppant is suspended in the viscosified brine. The proppant may thus be delivered by a small injection pump to the carrier fluid at an injection point downstream from the pumps used to transport the gravel packing fluid or other treatment fluid.

The invention will be further described with respect to the following Examples which are not meant to limit the invention, but rather to further illustrate the various embodiments.

EXAMPLES 1-5

A synthetic multi-component gas mixture that has become a reference or baseline composition gas for gas hydrate inhibitor testing was used in the Examples. The reference gas mixture has the composition shown in Table I.

TABLE I

Composition of Reference Gas Mixture

| Compound | Mole % |
| --- | --- |
| Methane | 87.200 |
| Nitrogen | 0.400 |
| Ethane | 7.580 |
| Propane | 3.090 |
| Isobutane | 0.496 |
| N-Butane | 0.792 |
| Isopentane | 0.203 |
| N-Pentane | 0.200 |
| Ethylene (as impurity) | 167 ppm |

An industry known gas hydrate prediction computer modeling software was used for generating the calculated or approximate data points for the thermo-dynamic inhibitor-gas hydrate equilibrium curves. This program was used to model hydrate phase equilibrium curves for reference gas mixture with no additives and differing proportions of varying additives as noted in the Table II chart:

TABLE II

Example/Figure/Additive Chart

| Example | FIG. | Additive |
| --- | --- | --- |
| 1 | 1 | Methanol |
| 2 | 2 | Ethylene glycol |
| 3 | 3 | Sodium chloride |
| 4 | 4 | Calcium chloride |
| 5 | 6 | Potassium formate |

It may be seen that in each case, the hydrate prediction modeling software predicts that the gas hydrate phase equilibrium curves are shifted to lower temperatures as the amount of additive added increases, indicating greater expected hydrate inhibition with increasing concentration. It may be seen that calcium chloride (Ex. 4, FIG. 4) would be expected to be a particularly effective hydrate inhibitor, with a greater predicted shift in equilibrium curve as a function of concentration as compared with the other additives. Use of high salinity $CaCl_2$ brine can also be a viscosity enhancing agent in VES fluids, that is, as part of a method to increase the viscosity yield of the VES surfactant.

EXAMPLES 6-8

Examples 6, 7 and 8 show in FIGS. 6, 7 and 8, respectively, how an increase in $CaCl_2$ salt additive concentration enhances VES fluid viscosity. The 100° F. (83° C.) and 150° F. (66° C.) data is for a 4% VES-gelled aqueous fluid (FIGS. 6 and 7), and the 175° F. (79° C.) data is for a 6% VES-gelled fluid. A proportion of 10 ppg $CaCl_2$ (1.2 kg/liter) is compared with a proportion of 9 ppg $CaCl_2$ (1.1 kg/liter). Although the increase seen in FIG. 6 (Example 6) is relatively small, the increase in viscosity is greater for FIGS. 7 and 8 (Examples 7 and 8, respectively). It should be noted that the y-axis viscosity scales for these three FIGS. is not the same, but increases with each successive Figure. This data demonstrates an increased viscosity using the additives of the invention.

In the foregoing specification, the invention has been described with reference to specific embodiments thereof, and has been demonstrated as effective in providing a VES-gelled fluid inhibited against hydrates. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, viscoelastic surfactants, hydrate inhibiting additives and other components falling within the claimed parameters, but not specifically identified or tried in a particular composition, are anticipated to be within the scope of this invention.

We claim:

1. A method for inhibiting hydrate formation in a treating fluid comprising:
   providing a gelled aqueous viscoelastic treating fluid comprising:
      an aqueous base fluid; and
      a non-ionic amine oxide viscoelastic surfactant (VES) gelling agent; and
   introducing into the aqueous viscoelastic treating fluid from about 0.1 to about 4.0 wt % of an additive effective to inhibit hydrate formation in the fluid, where the additive is soluble in the fluid and is selected from the group consisting of polyamines, polyvinyl alcohols, polycaprolactams and mixtures thereof.

2. The method of claim 1 where the VES is present in the aqueous base fluid in a proportion from about 0.5 to about 25 vol %.

3. The method of claim 1 where the non-ionic amine oxide surfactant gelling agent has the formula $RN^+(R')_2O^-$ where R is an alkyl or alkylamido group averaging from about 8 to 24 carbon atoms and R' are independently alkyl groups averaging from about 1 to 6 carbon atoms.

4. A method for inhibiting hydrate formation in a treating fluid comprising:
   providing a gelled aqueous viscoelastic treating fluid comprising:
      an aqueous base fluid; and
      a non-ionic amine oxide viscoelastic surfactant (VES) gelling agent; and
   introducing into the aqueous viscoelastic treating fluid from about 0.1 to about 4.0 wt % of an additive effective to inhibit hydrate formation in the fluid, where the additive is soluble in the fluid and is selected from the group consisting of polyamines, polyvinyl alcohols, polycaprolactams and mixtures thereof;
   where the aqueous viscoelastic treating fluid has a property selected from the group consisting of:
      improved hydrate inhibition, as compared with an otherwise identical fluid absent the additive, and
      increased viscosity, as compared with an otherwise identical fluid absent the additive, except where the additive in the identical fluid is selected from the group consisting of glycol amines, polyglycerin, xylitol, and mixtures thereof, and
      both.

* * * * *